July 24, 1956 H. G. YATES 2,756,077
PIPE JOINTS WITH METALLIC RING SEALS
Filed Oct. 8, 1952
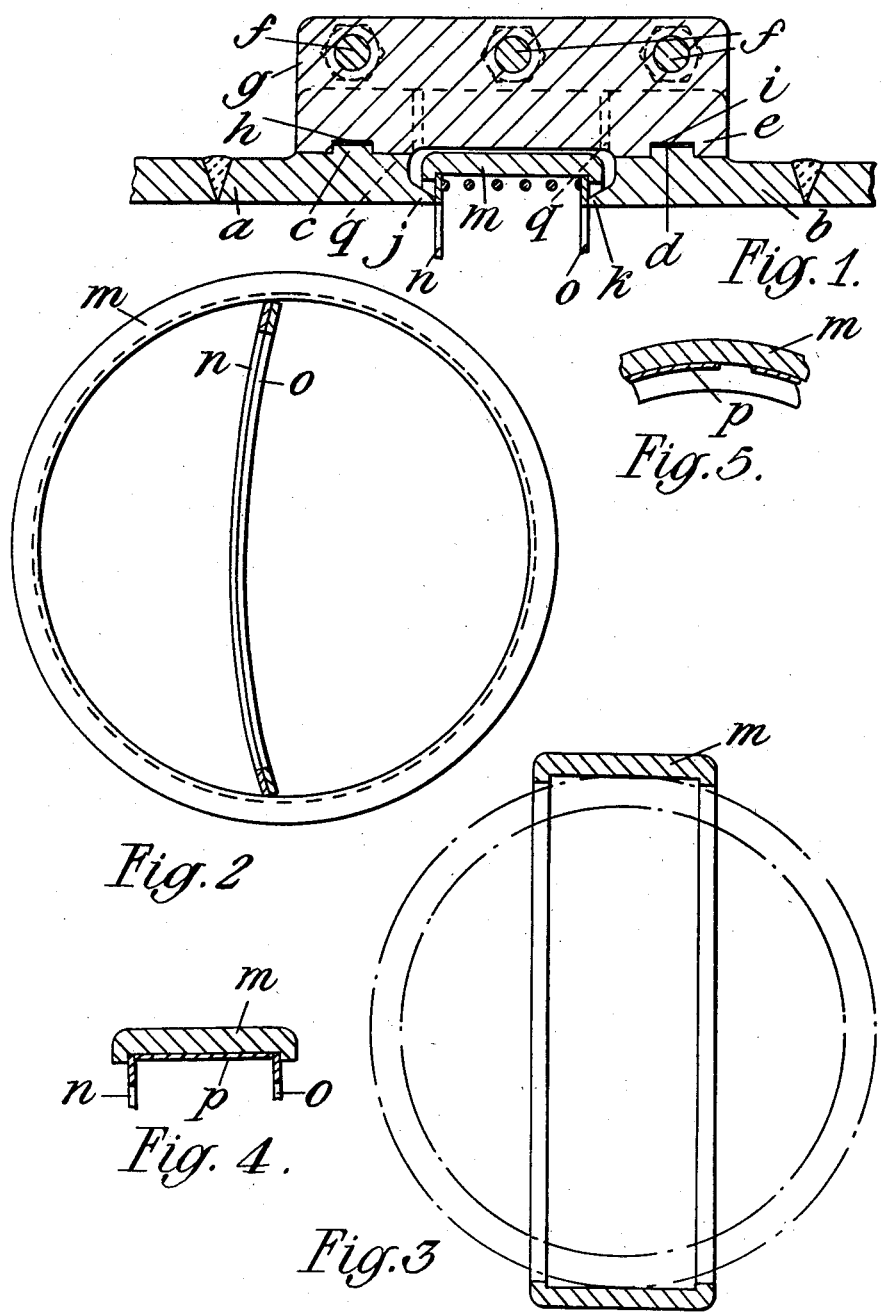

United States Patent Office 2,756,077
Patented July 24, 1956

2,756,077

PIPE JOINTS WITH METALLIC RING SEALS

Henry George Yates, Riding Mill, England, assignor to The Parsons and Marine Engineering Turbine Research and Development Association, Wallsend, England Application October 8, 1952, Serial No. 313,767

Claims priority, application Great Britain October 9, 1951

6 Claims. (Cl. 285—95)

This invention relates to pipe joints for enabling two lengths of pipe carrying fluid under pressure to be joined by a connection that can be broken at will.

The object of the present invention is to provide forms of such joints that are inherently smaller and lighter than the exterior flanged joint and in which a saving in space and weight becomes increasingly greater as the fluid pressure increases.

The invention consists in pipe joints incorporating features as set forth in the claims appended hereto.

Referring to the accompanying diagrammatic drawings:

Figure 1 is a part longitudinal sectional view of a convenient form of pipe joint embodying the present invention;

Figure 2 is a sectional elevation of a detail;

Figure 3 is a cross-sectional view of the detail of Figure 2;

Figure 4 is a part longitudinal sectional view of a modified detail; and

Figure 5 is a part cross-sectional view of the detail of Figure 4.

In carrying the invention into effect according to one convenient form illustrated by way of example in Figure 1, near the adjacent ends of two sleeve members $a$, $b$ welded to adjacent ends of two pipe lengths, annular ridges $c$, $d$ are formed and an encircling clamping ring $e$ formed in two or more parts bolted by means of bolts $f$ and flanges $g$ or otherwise secured together and having corresponding internal annular grooves $h$, $i$ is fitted so as to transmit the axial thrust due to hydraulic pressure acting over the cross-sectional area of the pipes from one pipe to the other.

The composite clamping ring $e$ is not itself subjected to fluid pressure, and consequently the bolts which join the two halves may be comparatively small in size, since when the clamping ring is assembled a space is formed between the adjacent ends of the pipe lengths. These pipe ends are suitably shaped at $j$, $k$ and between the adjacent ends is fitted a cylindrical ring $m$ furnished with an internal recess within which are carried two flexible annular plates $n$, $o$ adapted to rest respectively against the respective faced ends of the pipe lengths and against the ends of the recess in the ring $m$, hydraulic pressure forcing the plates into intimate contact both with the end faces of the recess and with the ends of the pipes.

In order to insert the sealing plates in position, they are conveniently sprung into a curved shape, as shown in Figures 2–3, and entered edgewise into the recess in in the ring $m$. They are then allowed to spring back into their normal flat annular form, and turned through 90° about a diameter to bring their axes to coincide with the axis of the ring. They are then separated axially so that each is adjacent to one end of the recess in the ring.

The plates are conveniently retained in position by means of a helical spring $n$ entered through the internal bore of one of the sealing plates by a kind of screwing motion.

An alternative means of holding the plates in position is to use a strip of thin resilient material $p$ (Figures 4–5) bent into the form of a cylinder of diameter slightly greater than the internal bore of the recess. To insert this it is sprung so as to form a split cylinder of diameter something smaller than the internal bore of the plates. This permits it to be entered into the space between the plates and released so as to spring into position between the plates (Figure 5).

Holes $q$ are provided in the clamping ring $e$ in order to prevent hydraulic pressure building up inside the clamping ring, and to ensure that the full pressure is available to act on the inner faces of the sealing plates so that they may maintain a good seal against the faces with which they make contact.

The space occupied by joints embodying the present invention is much less than with the normal type using bolted flanges, since the clamping ring has much greater strength for withstanding the end thrust on the pipes. In order to break the joint it is merely necessary to remove the clamping ring, when the two pipes may immediately be separated and the central ring carrying the sealing plates may also be withdrawn for examination or replacement if necessary.

If desired, instead of providing internal annular grooves on the encircling split clamping ring, projecting ridges may be substituted for engaging corresponding grooves in the periphery of the adjacent pipe lengths.

I claim:

1. A joint for two adjacent pipe ends, comprising a one-piece cylindrical metal ring, an internal flange at each end thereof the inner opposed faces of which are coplanar with the adjacent ends of the respective pipes, a pair of spaced annular metal plates, resilient means urging each said plate into abutment with one of said opposed faces and one of said adjacent pipe ends, an annular external projection near each adjacent pipe end, a split clamping metal band encircling said cylindrical metal ring and a pair of annular internal grooves in said band engaging said projections respectively.

2. A joint for two adjacent pipe ends, comprising a one-piece cylindrical metal ring, an internal flange at each end thereof the opposed faces of which are coplanar with the adjacent ends of the respective pipes, a pair of annular metal plates each in abutment with one of said opposed faces and its said coplanar adjacent pipe end, a split clamping metal band encircling said cylindrical metal ring and a pair of annular interengaging grooves and projections locking said band on said pipe ends.

3. A joint as claimed in claim 1, in which said resilient means comprises a helical spring disposed between said annular plates.

4. A joint as claimed in claim 1, in which said resilient means comprises a thin metal strip of material bent to cylindrical form and sprung into position between said annular plates.

5. A pipe joint as claimed in claim 2, including a helical spring disposed between said annular plates and resiliently urging the same against the said opposed faces and adjacent pipe ends.

6. A pipe joint as claimed in claim 2, including a thin metal strip of material bent to cylindrical form and sprung into position between said annular plates and resiliently urging the same against the said opposed faces and adjacent pipe ends.

References Cited in the file of this patent

UNITED STATES PATENTS

| | | | |
|---|---|---|---|
| Re. 20,842 | Meyer | | Aug. 30, 1938 |
| 739,624 | Traver | | Sept. 22, 1903 |
| 1,867,891 | Reynolds | | July 19, 1932 |
| 2,390,892 | McCormack | | Dec. 11, 1945 |

FOREIGN PATENTS

| | | | |
|---|---|---|---|
| 258,408 | Germany | | Apr. 4, 1913 |